(12) United States Patent
Takeuchi

(10) Patent No.: US 6,424,608 B1
(45) Date of Patent: Jul. 23, 2002

(54) OPTICAL APPARATUS USED FOR OPTICAL DISK RECORDING AND REPRODUCING APPARATUS

(75) Inventor: Ryoji Takeuchi, Matsudo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/394,033

(22) Filed: Sep. 13, 1999

(30) Foreign Application Priority Data

Sep. 17, 1998 (JP) .......................................... 10-263104

(51) Int. Cl.7 ................................................. G11B 7/00
(52) U.S. Cl. .................................. 369/47.53; 369/47.45
(58) Field of Search ............................... 369/116, 47.5, 369/47.51, 44.37, 47.53, 47.45

(56) References Cited

U.S. PATENT DOCUMENTS

| 5,068,843 A | * | 11/1991 | Takeshita et al. ............. 369/116 |
| 5,177,727 A | * | 1/1993 | Mashimo ...................... 369/116 |
| 5,442,597 A | * | 8/1995 | Spruit et al. .................. 369/116 |
| 5,463,610 A | * | 10/1995 | Nishikawa .................... 369/116 |
| 5,594,711 A | * | 1/1997 | Koyama ....................... 369/116 |
| 6,285,639 B1 | * | 4/1998 | Maenza et al. ............... 369/116 |
| 6,091,693 A | * | 6/2000 | Morimoto ..................... 369/116 |
| 6,172,958 B1 | * | 8/2001 | Mochizuki et al. .......... 369/116 |
| 6,278,679 B1 | * | 8/2001 | Weiss et al. .................. 369/116 |

* cited by examiner

Primary Examiner—Nabil Hindi
(74) Attorney, Agent, or Firm—Pillsbury Winthrop LLP

(57) ABSTRACT

An optical apparatus for an optical disk recording/reproducing apparatus including a recording laser light emitting device emitting a recording beam for recording data on an optical disk, a reproduction laser light emitting device provided near the recording laser light emitting device and emitting a reproducing beam for reproducing data and a reproduction photo-detector receiving and detecting reflection light of the reproducing beam. By providing light emitting devices dedicated to the recording beam and the reproducing beam, respectively, it is possible to reproduce data while recording the data.

15 Claims, 8 Drawing Sheets

OPTICAL APPARATUS USED FOR OPTICAL DISK RECORDING AND REPRODUCING APPARATUS

BACKGROUND OF THE INVENTION

The present invention relates to an optical apparatus and relates to an optical apparatus mainly used for an optical disk apparatus of recording/reproducing type.

In recent years, optical disk apparatuses have been widely used as media for reproducing sounds and pictures. Further, optical disk recording/reproducing apparatuses for not only reproducing but also recording data on optical disks have been manufactured and used.

In an optical disk recording/reproducing apparatus of this type, a laser beam is used for both recording and reproduction in the optical system of the apparatus. Due to this, it is impossible to check whether recorded data of, for example, a picture is suited for reproduction while recording the picture on an optical disk. To check the recording state, it is required to record all or part of pictures on the optical disk and then reproducing the recorded pictures.

In other words, in a conventional optical disk recording/reproducing apparatus a light emitting device emitting a laser beam radiated on the surface of an optical disk is used for both recording and reproduction during recording and reproduction, respectively. For that reason, it is impossible to record pictures or the like and reproduce the pictures which have been just recorded, during recording, to monitor the recording device.

As stated above, since there is no conventional optical disk reproducing apparatus of such a type as simultaneously emitting two or more recording laser beams, it is impossible to record image information or the like, and reproduce and monitor the image information which has been recorded during recording. Owing to this, if the recorded information is reproduced after all recording processings have been completed, it includes noise and recording processings need to be started over again, which is quite inconvenient.

Furthermore, in a master disk recorder in which two laser beams of different wavelengths are simultaneously radiated, two laser spots are manually adjusted by observing the spot positions. The master disk recorder, however, has disadvantages in that it requires labor since a guide beam is arranged in front of a recording beam to monitor a state just before recording, a guide beam is arranged in back of a recording beam to check a recording state right after recording or the like.

Additionally, there is no optical disk recording/reproducing apparatus in which a recording beam and a reproduction beam are individually provided. For that reason, to check a recording-state, reflection light during recording has been conventionally checked, for example. In recording operation, however, the quantity of reflection light tends to be greatly irregular, with the result that accuracy for calibrating recording power cannot be disadvantageously increased.

Meanwhile, a master disk recorder is capable of monitoring a state in which data is recorded with a recording beam, by means of a guide beam; however, after monitoring a recorded state, the quantity of recording light beam is not subjected to real-time feedback. The positions of two laser spots slightly vary with environment such as temperature. In the master disk recorder, these variations are adjusted every time they are found. The problem with an optical disk apparatus used by an ordinary user, on the other hand, is that the user is incapable of adjusting the optical axis of the apparatus.

BRIEF SUMMARY OF THE INVENTION

It is, therefore, an object of the present invention to provide an optical apparatus used for an optical disk recording/reproducing apparatus capable of realizing high reliability in recording operation by independently providing a recording beam and a reproducing beam.

The present invention is an optical apparatus for an optical disk recording/reproducing apparatus, comprising first emitting means for emitting a recording beam for recording data on an optical disk; second emitting means, provided near the first emitting means, for emitting a reproducing beam for reproducing the data recorded on the optical disk; and detecting means for receiving and detecting light of the reproducing beam emitted from the second emitting means.

According to the present invention, as described above, a recording beam and a reproducing beam dedicated to recording and reproduction, respectively, are provided. This makes it possible to record data on a disk and reproduce the data while data is still recorded. Due to this, it is possible to monitor a recording state while data is recorded. Thus, compared with a conventional apparatus in which a bad recording state is discovered only after data recording is completed, it is possible to ensure recording data according to the present invention. It is also possible to adjust, for example, a focus or track direction or to adjust the light power of a recording beam and a reproducing beam or the like simultaneously with data recording according to the present invention.

Moreover, the present invention is an optical apparatus for an optical disk recording/reproducing apparatus, comprising first emitting means for emitting a first beam onto an optical disk; second emitting means, provided near the first emitting means, for emitting a reproducing beam for reproducing data recorded on the optical disk so that a wave front aberration is $0.07\lambda$ or less, the wave front aberration being generated when a second beam is, arranged near the first beam emitted from the first emitting means; and detecting means for receiving and detecting at least one of reflection light of the first beam emitted from the first emitting means and reflection light of the second emitting beam emitted from the second emitting means.

With the above-stated structure, the present invention clearly specifies a limit in a case where the first beam and the second beam are emitted on the disk while being separated from each other to a maximum without overlapping each other. In other words, the arrangement of the two beams indicated by the Marechal's limit requires that the wave front aberration caused by separate emission be $0.07\lambda$ or less. The present invention provides an optical apparatus capable of ensuring correct data recording and reproduction as long as the beams are emitted within that range.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Now, the first embodiment of the present invention will be described with reference to the accompanied drawings.
[First Embodiment]

The first embodiment specifies an optical apparatus used for an optical disk recording/reproducing apparatus provided with two light beam emitting devices for recording and reproduction, respectively and an optical apparatus automatically correcting operating parameters by using the two light beam emitting devices.

Figure 1:
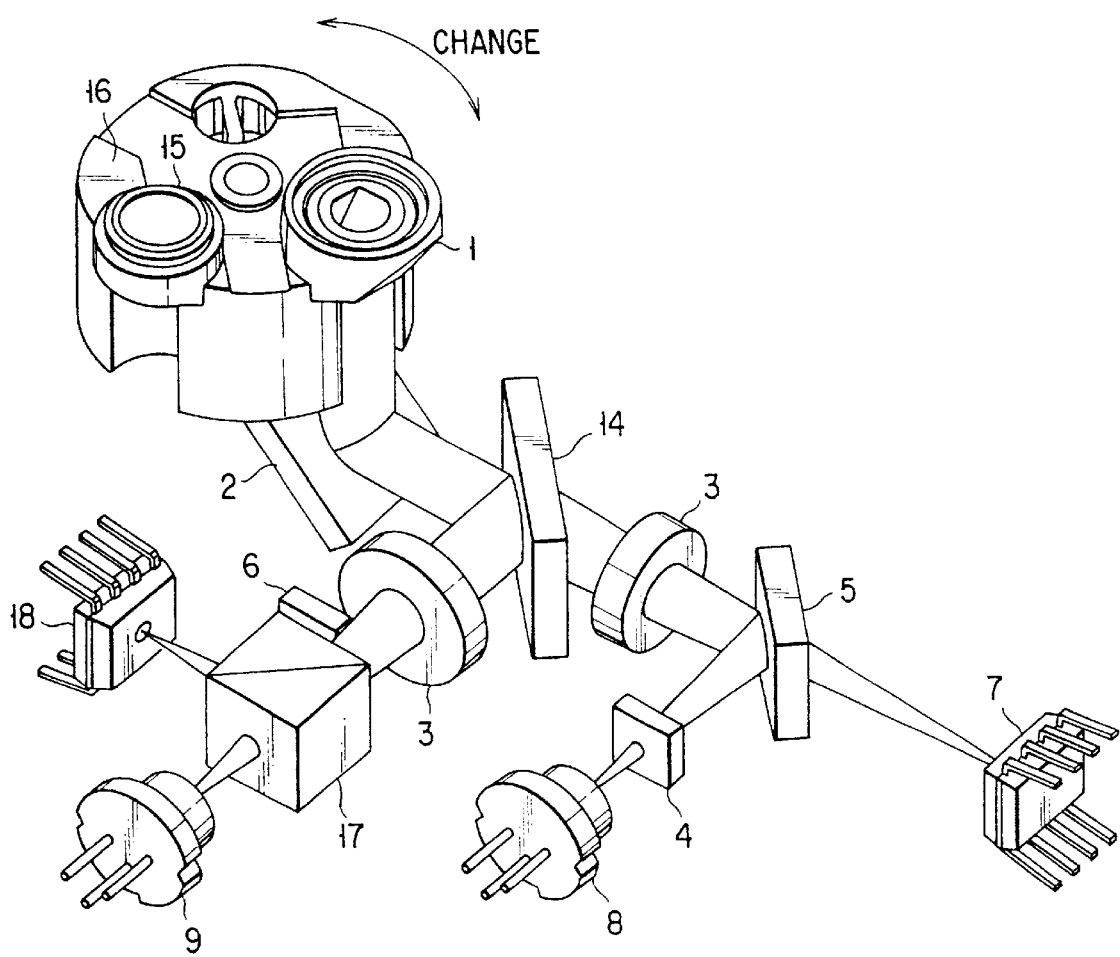
FIG. 1 is an arrangement view showing an example of the arrangement of components of an optical apparatus according to the present invention.
Figure 2:
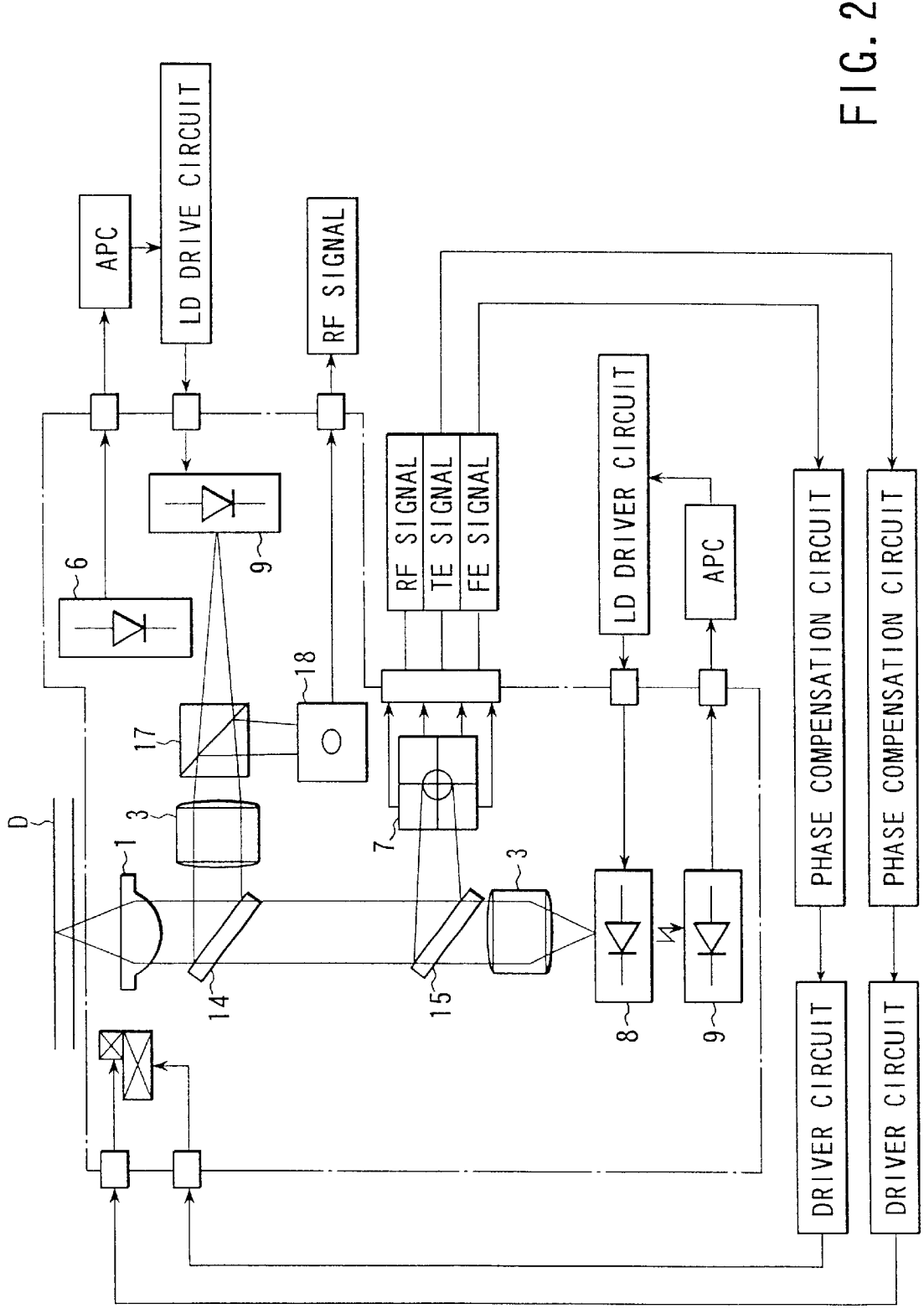
FIG. 2 is a block diagram showing an example of the optical apparatus according to the present invention.

FIG. 1 is an arrangement view showing an example of the arrangement of components of an optical apparatus according to the present invention. FIG. 2 is a block diagram showing an example of an optical apparatus according to the present invention.

As shown therein, the optical apparatus used for the optical disk recording/reproducing apparatus according to the present invention includes a reproduction laser light emitting device 9 emitting a laser beam for reproduction, a light isolator 18 receiving the laser beam from the device 9, a reproduction photo-detector 18, a collimator lens 3, a photo-detector 6 for a front monitor provided at the side of the collimator lens 3, a dichroic device 14, a rising mirror 2 receiving reflection light from the dichroic device 14 and an objective lens 15 for reproduction stored in a lens holder 16.

The optical apparatus according to the present invention is also an apparatus provided with a dedicated recording laser beam, a passage for the laser beam and the like and includes a recording laser light emitting device 8, an analytical grating 4, a half mirror 5, a photo-detector 7 for servo data and an objective lens 1 supplied with laser passed through the photo-detector 7. FIG. 2 is a block diagram for describing the optical apparatus according to the present invention as well as its peripheral circuits.

With the above constitution, laser light emitted from the recording laser light emitting device 8 passes the collimator lens 3 and the dichroic device 14, passes through the objective lens 1 by way of the rising mirror 2 and reaches the surface of a disk D. Meanwhile, laser light emitted from the reproduction laser light emitting device 9 passes the collimator lens 3 and the dichroic device 14, passes through the objective lens 15 by way of the rising mirror 2 and reaches the surface of the disk D. Among the light which has reached the disk, the reflection light of the recording beam cannot pass through the dichroic device 14 and cannot be applied to a detecting device 18, whereas the reproduction laser light can pass through the dichroic device 14 and reaches the detecting device 18 by way of a detection prism 17.

Figure 3:
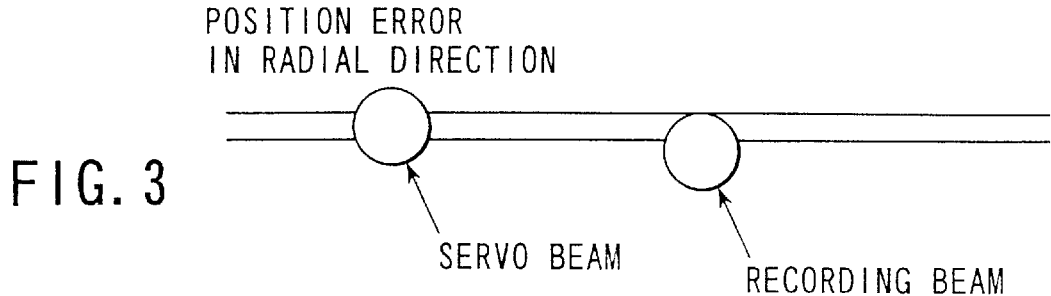
FIG. 3 shows the relationship between a servo beam spot and a recording beam spot.

FIG. 3 shows the relationship between a servo beam spot and a recording beam spot. AS shown therein, the servo beam and the recording beam are aligned on a single track. In FIG. 3, the recording beam is arranged in front of the servo and reproducing beam. It is also possible that the recording beam is arranged in back of the servo and reproducing beam. In that case, the position of the recording beam is shifted from that of the reproducing beam by one track and the recording beam is one-track ahead of the reproducing beam. In addition, the two laser beams have different wavelengths, i.e., the wavelength of the recording beam is shorter than that of the reproducing beam. It is suited that the recording beam has a wavelength of, for example, 780 nm and the reproducing beam has a wavelength of, for example, 650 nm.

During recording operation, servo is performed using a reproducing beam spot and recording is performed using a recording beam spot. By doing so, the servo beam is free from the influence of the light beam, thereby making it possible to realize stable servo operation. In tracking servo, the wavelength of a laser beam is limited according to the shape of a groove on the disk. By utilizing this method, the wavelength of the laser beam is not limited and a recording wavelength ideal to a light sensitive film of the disk can be, therefore, selected.

Further, during recording operation, the recording beam is emitted ahead of the reproducing beam to record data. Owing to this, the reproducing beam can reproduce a signal which has just recorded in a signal reproducing system.

In the signal reproducing system, the asymmetry, jitter and the like of a reproduced signal are measured. An asymmetry value tends to be high when light power is excessively high and low when light power is excessively low. A jitter value tends to be the lowest when light power is optimal and high when light power is either excessively high or low.

Using the reproduced signal after recording, those values are calculated, a plurality of factors are subjected to specific gravity addition processing, smoothing processing for removing noise is performed, it is determined whether light power is increased or decreased and the light power is then adjusted. This flow of processings can be continuously conducted, so that it is possible to form a feed-back loop for determining light power.

Figure 4:
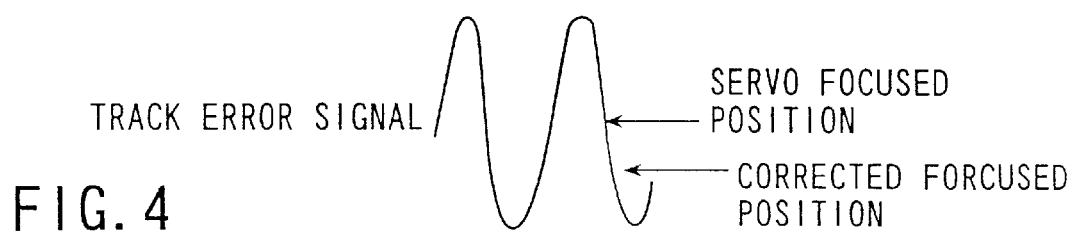
FIG. 4 is a graph showing a track error signal.
Figure 5:
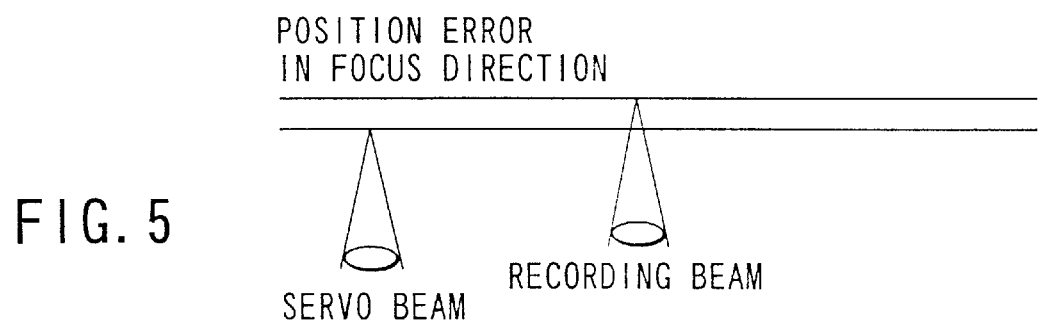
FIG. 5 shows the position error between a servo beam and a recording beam in focus direction.
Figure 6:
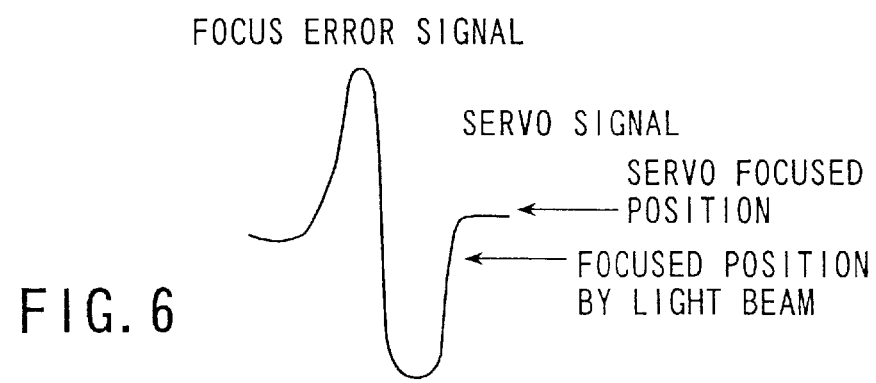
FIG. 6 is a graph showing a focus error signal.

With this constitution, however, if there is a position error between the servo beam and the light beam in focus and radial directions, focus offset and track offset occur to the light beam even though servo is correctly performed. FIG. 3 shows the relationship between a servo beam spot and a recording beam spot. FIG. 4 is a graph showing a track error signal. FIG. 5 shows the position error between a servo beam and a recording beam in focus direction. FIG. 6 is a graph showing a focus error signal. As shown therein, even if the position error can be adjusted within some range during assembly and adjustment, it is still difficult to adjust the position error quantity to fall within an allowable quantity (0.5 λm or less in focus direction and 0.1 λm or less in radial direction). Besides, even after the apparatus is assembled, the positional relationship between the two beams may vary with the passage of time. It is, therefore, required to provide means for correcting the positional relationship between the two beams.

Now, if a light beam per se does not have means for detecting a focus position and a radial position, a shift from its normal position is detected by the servo beam's reading the shift from the data recorded by the light beam.

In a case where a disk apparatus records data, data is recorded in a trial area and thereafter actual data is recorded. Considering this, the present invention employs a method of recording data in a trial area while adding an offset to focus tracking, setting the offset of the focus tracking to a condition under which ideal recording is carried out, and thereby correcting position errors in focus and radial directions between the servo beam and the light beam.

The trial recording area has been conventionally, used to change light power and determine ideal power for the disk. According to the present invention, by contrast, the trial recording area is used to determine three parameters of focus offset, track offset and light power. Parameters for determining whether or not data is defective involve asymmetry, jitter, data error rate, data signal amplitude and the like. In actually making a determination, those values are subjected to numeric value processing and added together and then a condition showing the highest total score is selected.

Figure 7:
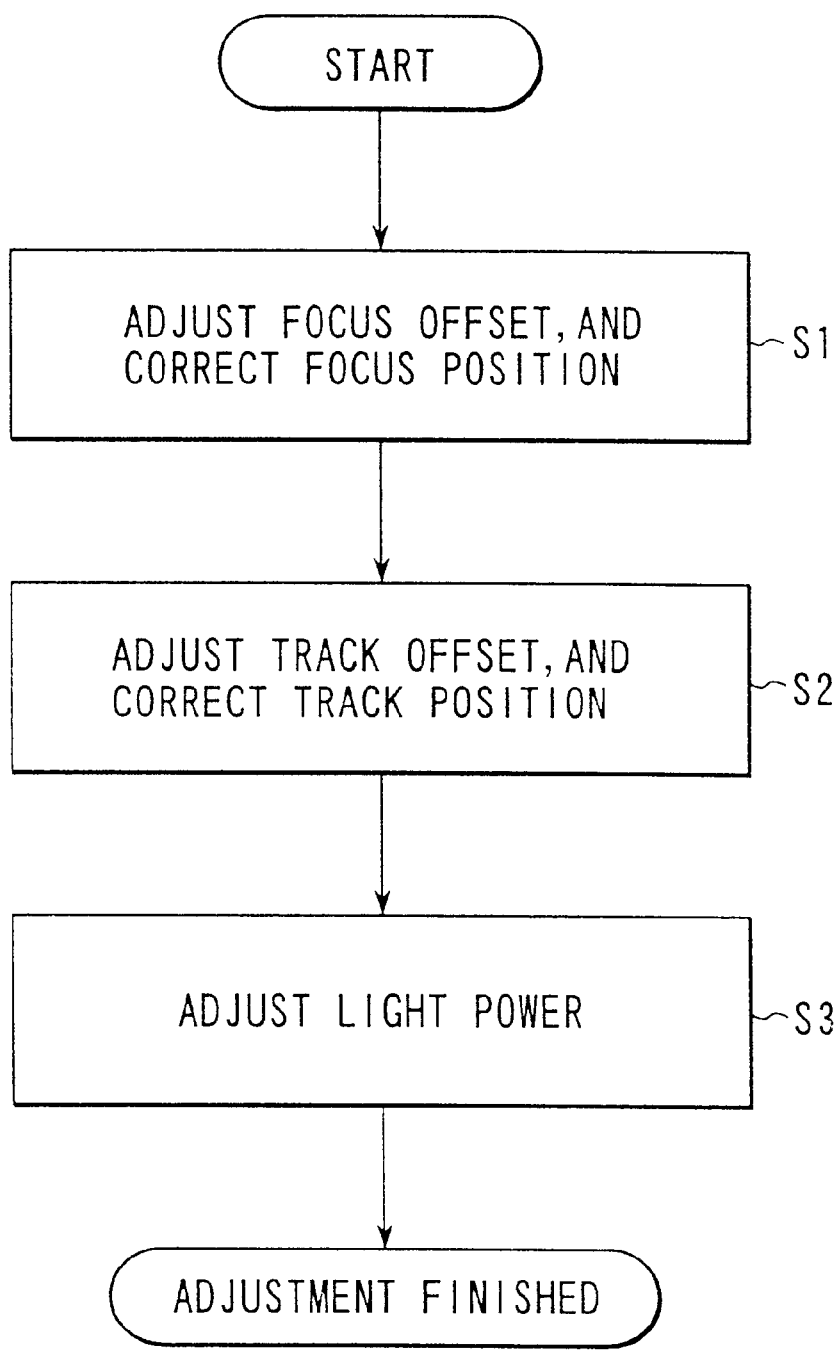
FIG. 7 is a flow chart showing adjustment processings for the optical apparatus according to the present invention.
Figure 8:
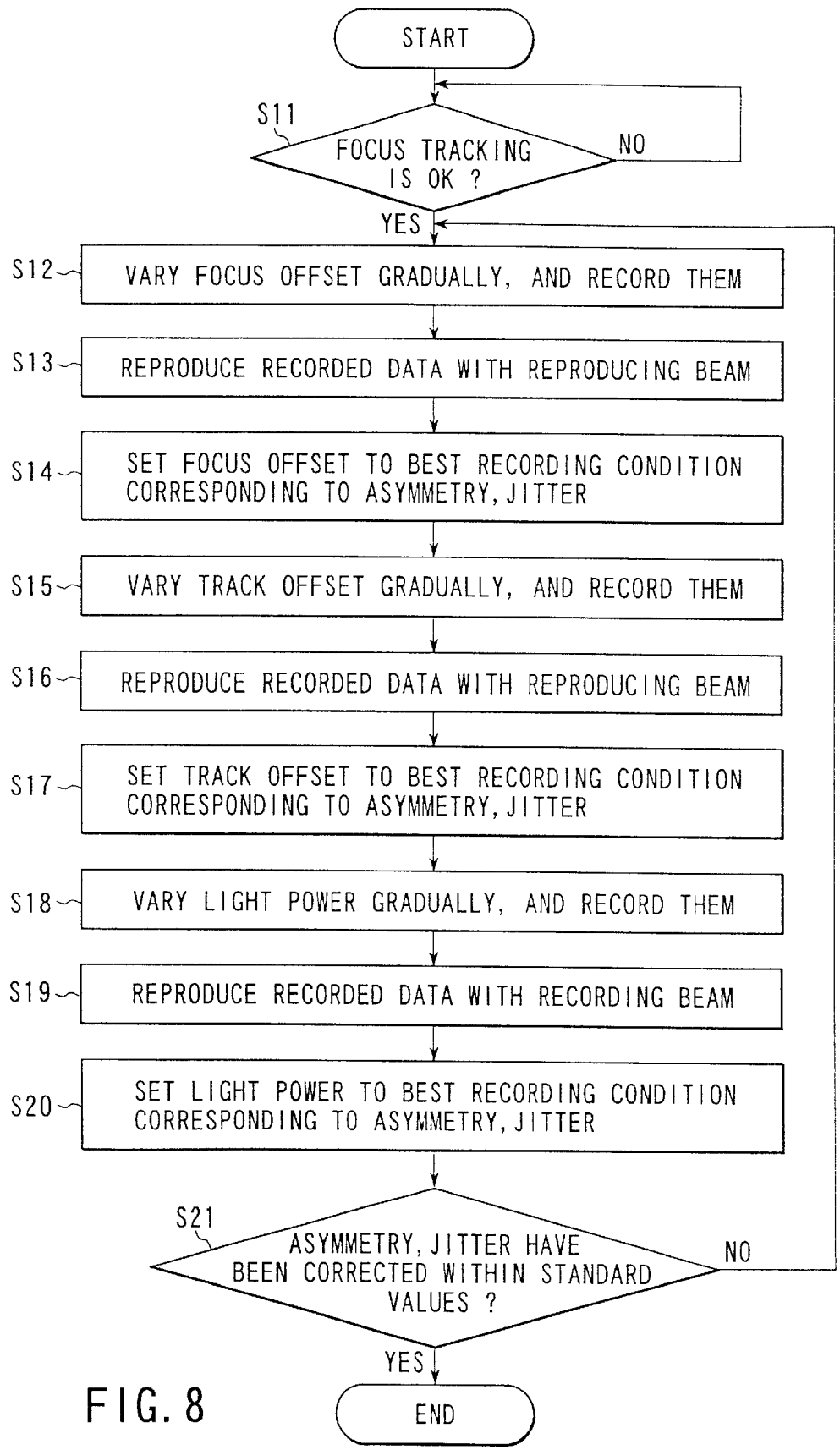
FIG. 8 is a flow chart showing adjustment processings for the optical apparatus according to the present invention in detail.
Figure 9:
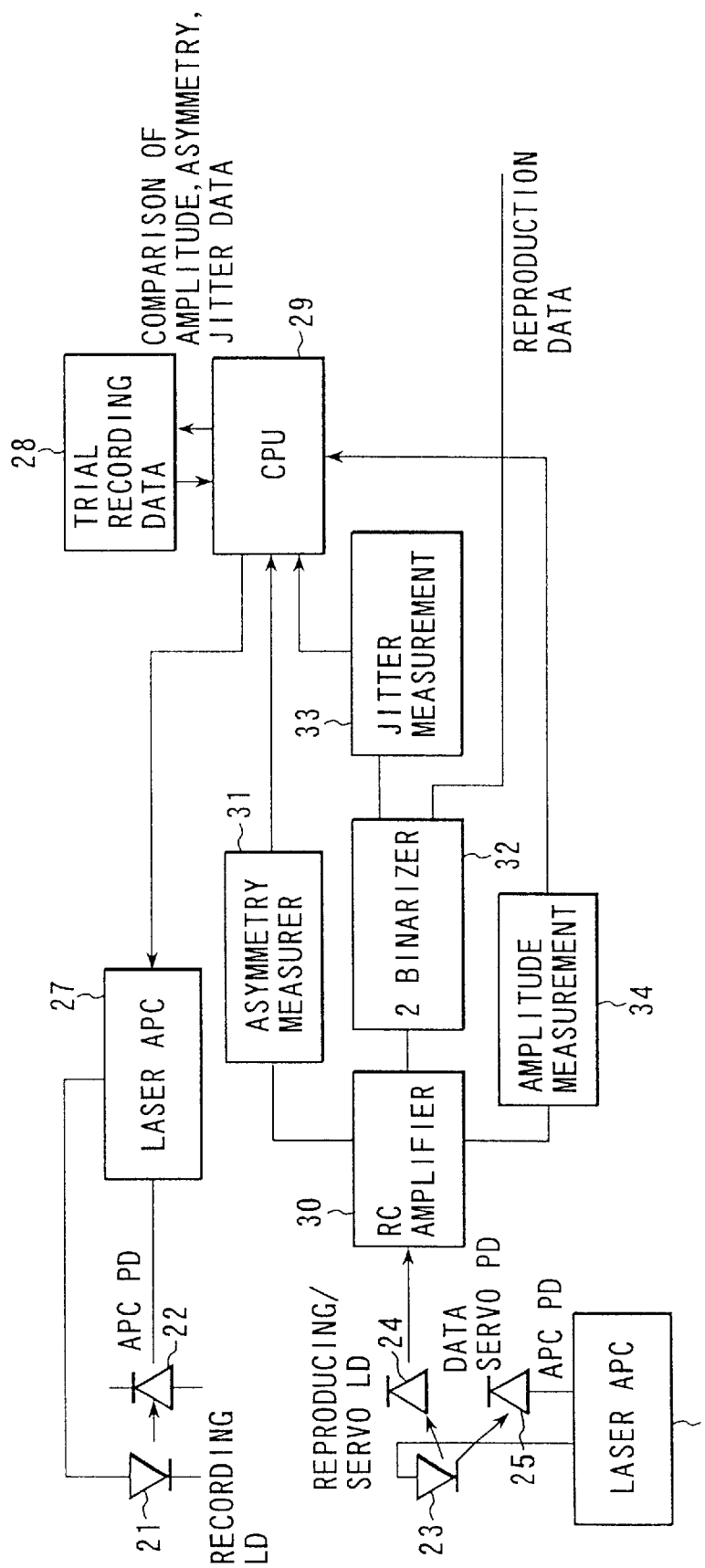
FIG. 9 is a block diagram of an optical apparatus according to the present invention.

Now, using drawings or flow charts shown therein, adjustment procedures will be described. FIG. 7 is a flow chart showing adjustment processings in an optical apparatus according to the present invention. FIG. 8 is a flow chart showing adjustment processings in the optical apparatus in detail according to the present invention. FIG. 9 is a block diagram of the optical apparatus according to the present invention.

First, processings will be outlined using the flow chart of FIG. 7. As shown, first, focus offset is adjusted and a focus position is corrected (in step S1). Next, track offset is adjusted and a track position is corrected (in step S2). Finally, based on the above, light power is adjusted and all adjustment processings are finished.

Next, processings will be described in detail using the flow chart of FIG. 8.

After focus tracking is stabilized (in step S11), focus offset is varied gradually (in step S12). Namely, while track offset is set at 0 and light power is fixed to a standard, data is recorded under conditions of focus offsets of −1, −0.5, 0, +0.5 and +1 (in step S12). Recorded data is reproduced with a reproducing beam (in step S13). An optimal point at which best recording can be carried out is determined from asymmetry and jitter, and focus offset is set (in step S14).

Next, while focus offset is fixed to an optimal point, data is recorded under conditions of track offsets of −0.2, −0.1, 0, +0.1 and +0.2 (in step S15). Recorded data is reproduced with a reproducing beam (in step S16). Optimal track offset is determined from asymmetry and jitter and the optimal point is set (in step S17).

Then, while focus offset and track offset are set at optimal ones, data is recorded under conditions of light power of standard−2, standard−1, standard, standard+1 and standard+2 (in step S18). The recorded data is reproduced with a reproducing beam (in step S19). Optimal light power is determined from asymmetry and jitter (in step S21). In this way, optimal focus offset, optimal track offset and optimal light power can be determined through 15 steps.

The order of adjustment processings is not necessarily limited to the above order, however, since the amplitude of the track error signal depends on focus offset and light power depends on focus offset and track offset, it is considered that adjustment procedures in the above order is most stable.

Figure 10:
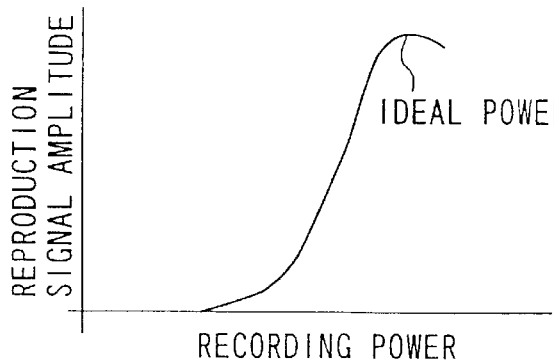
FIG. 10 is a graph showing the reproduction signal amplitude of the optical apparatus according to the present invention.
Figure 11:
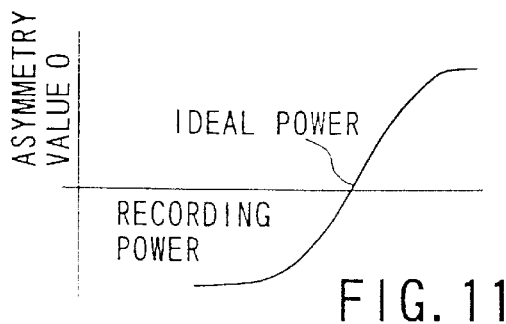
FIG. 11 is a graph showing the,asymmetry of the optical apparatus according to the present invention.
Figure 12:
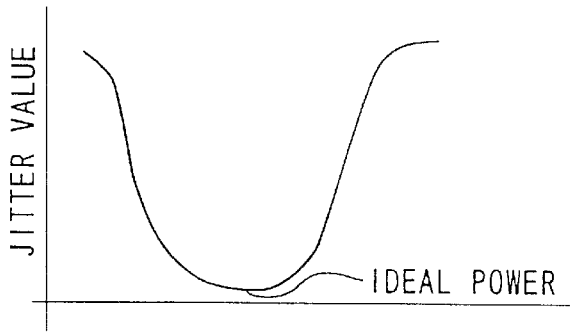
FIG. 12 is a graph showing jitter values of the optical apparatus according to the present invention.

Asymmetry, jitter, data error rate and data signal amplitude are used as basis for determining whether or not data is defective. FIG. 10 is a graph showing reproducing signal amplitude in the optical apparatus according to the present invention. FIG. 11 is a graph showing the asymmetry of the optical apparatus according to the present invention. FIG. 12 is a graph showing the jitter value of the optical apparatus according to the present invention. Asymmetry means a phenomenon in which central values differ among recording patterns (3T, 4T, 5T, . . . , 11T). To correctly provide binary data, data slice level needs to be changed with asymmetry made minimum. Asymmetry varies with light power, focus offset and track offset. It is known that asymmetry becomes zero if these parameters are optimally adjusted. Jitter indicates a shift between the edge of a data signal and that of a standard clock and varies with light power, focus offset and track offset. It is known that jitter becomes the lowest if these parameters are adjusted optimally.

Data error rate indicates whether data has been correctly reproduced and varies with light power, focus offset and track offset. By adjusting these parameters optimally, the data error rate becomes an ideal level.

Data signal amplitude varies with light power, focus offset and track offset. By adjusting these parameters optimally, a data signal has the largest amplitude.

As stated above, all of these indexes vary with light power, focus offset and track offset. They are the same in that a numeric value as an index becomes optimal by adjusting the parameters to ideal ones.

Nevertheless, when light power, focus offset and track offset are changed in the vicinity of optimal points, the numeric values of these indexes vary differently (for instance, the error rate does not vary at all even if the light power, focus offset and track offset are varied in the vicinity of respective optimal points and abruptly becomes worse if they are varied to be greater than certain levels, respectively). Which index should be respected in which case depends.

Owing to this, the values of the indexes (asymmetry, jitter, data error rate, data signal amplitude) are designed to be read by a CPU. Different weights are added thereto in accordance with cases, arithmetic processing is conducted and a recording state is thereby determined by firm ware.

Recording operation is carried out in a state in which the adjusted focus offset value and track offset values are added to the indexes. By doing so, even if there is a position error between the servo beam and the recording beam in focus and track directions, the error can be corrected and data can be recorded at a correct focus/track position.

If the focus offset and track offset are adjusted, data is recorded and the recorded data is reproduced, then the data is reproduced in a state in which the focus offset and track offset are added. The reproducing beam is set to have a small NA and focus offset and track offset margins for reproduction are set wider than those for recording. Due to this, recorded data varies faster than the reproduced data if the focus offset and track offset are varied. Thus, it is possible to read a change in recorded data from reproduced data even when the data, which has been recorded while varying the focus offset and track offset, is read.

In case of adjusting light power or the like, focus offset, track offset and light power are varied in a trial recording area and recorded before actual data recording is started, to thereby discover optimal light power. In this case, if combinations of parameters and the relationship between the asymmetry and jitter of the recorded data are stored in a table, it is possible to know which recording parameter of the currently recorded data has an error in which degree by comparing a reproduced signal during actual recording and table data. As a result, it is possible to correct the data while recording data.

Figure 15:
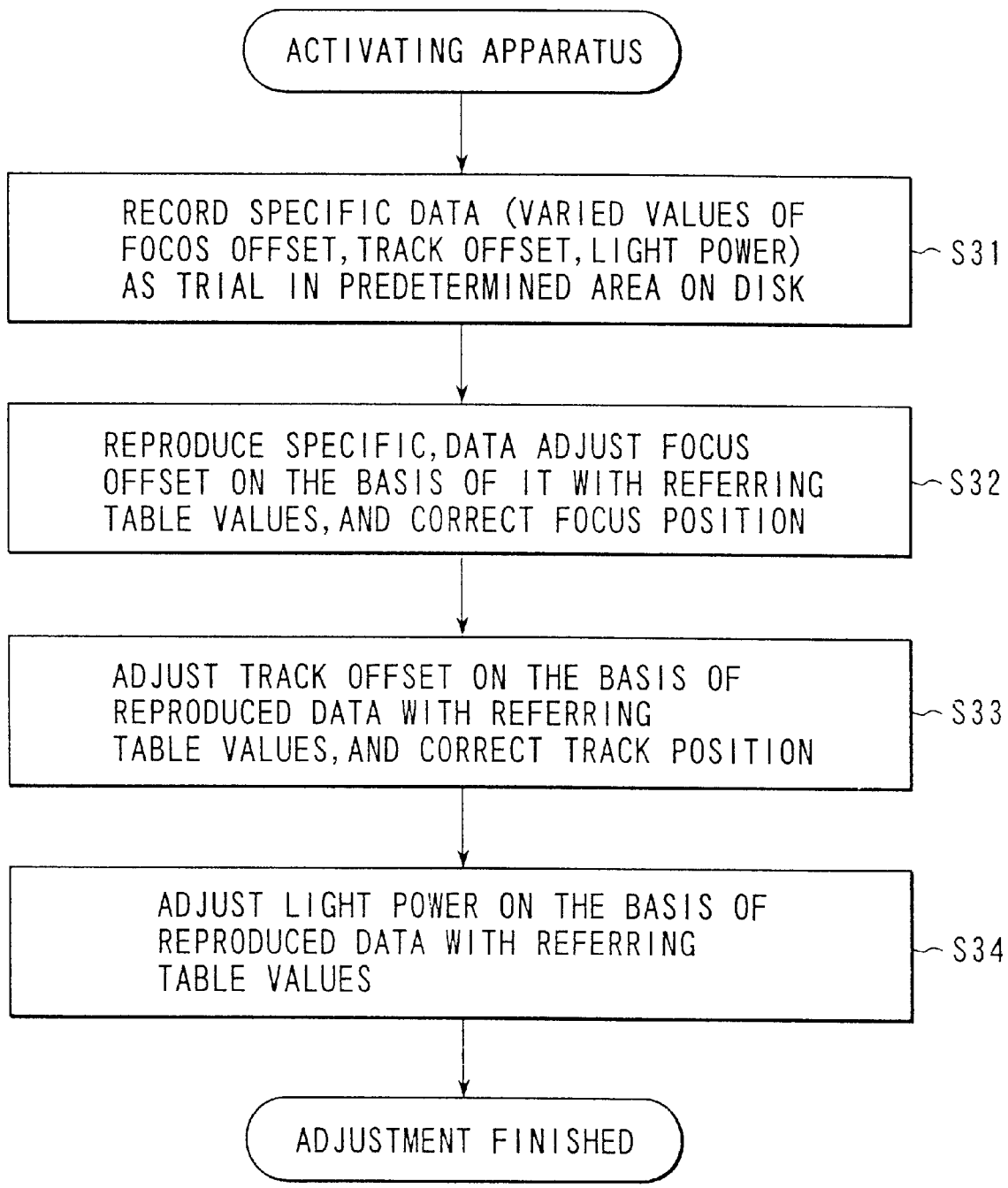
FIG. 15 is a flow chart showing adjustment processings including trial recording in the optical apparatus according to the present invention.

Moreover, as shown in FIG. 15, when this optical apparatus is activated, the focus offset position, track offset position and light power may be corrected. In other words, if the optical apparatus is activated, specific information, i.e., gradually varied values of focus offset, track offset and light power are recorded, as trial recording, in an area on a recording disk in which data can be recorded (in step S31). Next, those recorded values, as trial recording, are reproduced, and asymmetry, jitter, data error rate and data signal amplitude at this time are detected. Then, values stored in advance on a data referring table are read, based on which focus offset is adjusted to an ideal level and a focus position is corrected (in step S32). In the same manner, the track offset is adjusted and a track position is optimized (in step S33). Likewise and finally, light power of each beam is optimized (in step S34). In this way, at the time of activating the optical apparatus, trial data recording is automatically carried out and respective characteristics are optimized in accordance with the characteristics of the disk, thereby making it possible to provide an optical apparatus capable of realizing data recording processing more surely and a disk recording/reproducing apparatus using the optical apparatus.

As stated above in detail, in a recording type optical apparatus in which a recording beam and a servo beam are separately provided according to the present invention, since a position error between the recording beam and the servo beam occurs, the recording beam has focus offset and track offset even if the servo beam pursues correct servo operation. However, by carrying out trial recording at the beginning of recording operation, varying the focus offset and track offset at that time and carrying out actual data recording under conditions under which data recording can be optimized, it is possible to correct the position error between the recording beam and the reproducing beam to thereby carry out good recording operation.

Further, the optical apparatus according to the present invention can reproduce data right after the data is recorded and can carry out recording operation while correcting recording conditions using the reproduced data. As a result, it is possible to greatly enhance reliability in the recording operation of the optical disk recording/reproducing apparatus.

[Second Embodiment]

Now, the second embodiment of the present invention will be described in detail with reference to the drawings.

The second embodiment concerns an optical apparatus in which two beam positions (a recording beam position and a reproducing beam position or two reproducing beam positions) within a Marechal's limit (wave front aberration of 0.07 λ or less) are specified, which optical apparatus specifies a case of conducting automatic processing of correcting respective operating parameters stated above.

Namely, in the conventional optical disk drive in which a recording beam and a reproducing beam are not separated, to check a recording state, a method of checking, for example, reflection light during recording operation has been adopted. The quantity of reflection light tends to be irregular greatly during recording operation and, therefore, accuracy for recording power calibration cannot be enhanced.

Meanwhile, in a master disk recorder, it is possible to monitor a state in which data is recorded by a recording beam, by using a guide beam. However, after monitoring the recording state, the quantity of recorded light beams is not fed back in a real-time manner. Even with a recording beam and a reproducing beam individually provided, if the recording beam is too close to the reproducing beam or the two beams overlap each other, recorded data cannot be accurately monitored. If the two beams are too distant from each other, axial error occurs between the lens and a laser beam, with the result that optical characteristics disadvantageously deteriorates.

Now, the movement of a laser beam at a time when the laser beam reaches an optical disk will be considered. Laser light emitted from a recording laser light emitting device 8 passes a collimator lens 3, a dichroic device 14, passes through an objective lens 1 by way of a rising mirror 2 and reaches the surface of a disk D. On the other hand, laser light emitted from a reproduction laser light emitting device 9 passes the collimator lens 3 and the dichroic device 14, passes through the objective lens 1 by way of the rising mirror 2 and reaches the surface of the disk D. Among the laser light which has reached the disk, the recording beam cannot pass through the dichroic device 14 in a direction in which a detecting device is provided and cannot be emitted into the detecting device, and a reproduction laser beam can pass through the dichroic device 14 and reach the detecting device by way of a detection prism 6.

Thus, the recording laser beam and the reproduction laser beam are emitted from the same objective lens 1 onto the disk D.

Figure 13:
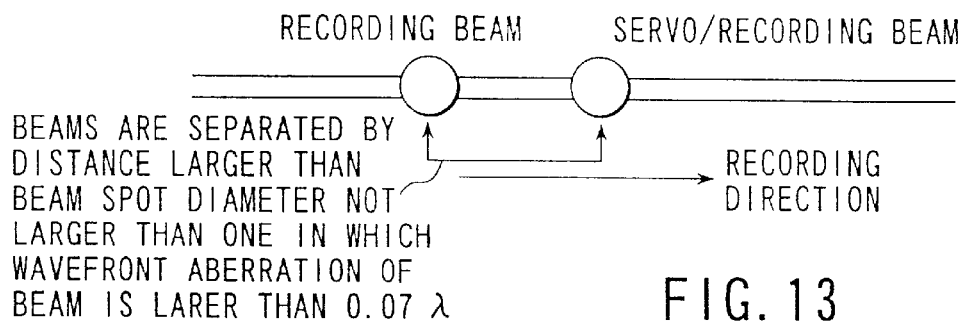
FIG. 13 shows the positional relationship between a recording beam and a servo/reproducing beam in the optical apparatus according to the present invention.
Figure 14:
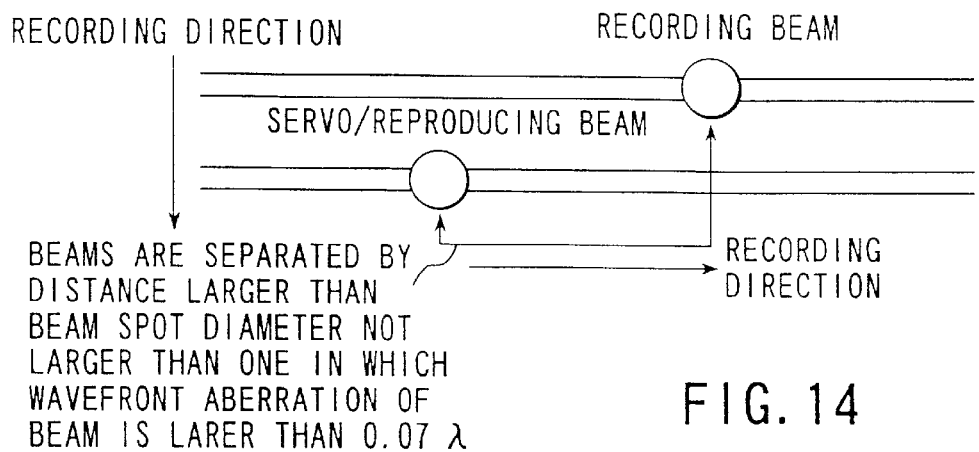
FIG. 14 shows the positional relationship between a recording beam and a servo/reproducing beam in the optical apparatus according to the present invention.

Now, the distance between the recording laser beam and the reproduction laser beam as well arrangement thereof will be considered with reference to the drawings. FIGS. 13 and 14 show the relationship between a recording beam and a reproducing beam in the optical apparatus according to the present invention. In FIGS. 13 and 14, if the recording laser beam is arranged ahead of the reproducing laser beam, the reproducing beam can reproduce a signal which has been just recorded in a signal reproduction system. The signal reproduction system measures the asymmetry, jitter and the like of the reproduced signal and adjusts light power while data is being recorded.

If the reproducing laser beam is arranged ahead of the recording beam and they are arranged on the same track, recorded data cannot be reproduced. Even with the reproducing beam arranged ahead of the recording beam, if the reproducing beam is arranged one-track behind of the recording beam, then the data which has been recorded one track before can be reproduced. The variation of light power depends on the characteristics such as temperature and media and does hardly abruptly vary. Due to this, even if data one-track ahead is reproduced, it is possible to measure the asymmetry and jitter of the reproduced signal and light power can be thereby adjusted while data is being recorded.

The light power varies in dependence on the characteristics such as temperature and media and does little change greatly. Due to this, even if one-track prior data is reproduced, the asymmetry, jitter and the like of the reproduced signal are measured and light power can be adjusted while data is being recorded.

If the position of the recording beam and that of the reproducing beam completely coincides with each other, even if data is reproduced by the reproduction beam, data in the middle of forming a mark is reproduced by the recording beam. Thus, the data is not completely the same as that reproduced after recording, thereby lowering data reliability.

From the above, therefore, it is preferable that the positional relationship between the recording beam and the reproducing beam is such that the recording light beam is arranged ahead of the reproducing light beam and that a mark formed by the recording light beam is reproduced by the reproducing light beam after the mark has been formed.

Nonetheless, the recording beam and the reproducing beam pass the same objective lens and are converged onto a disk. Due to this, the following problem occurs that the quality of beam spots become lower as the beam positions are shifted from each other more greatly. If the recording beam is arranged on the center line of the objective lens and the reproducing beam is shifted from the center of the objective lens, there occurs Marechal's limit that a CD signal cannot be reproduced if the wave front aberration generated by shifting the reproducing beam from the center is $0.07\lambda$ or more. Unless the reproducing beam is arranged close to the center of the objective lens so as to have a height shorter than the height of an image specified by the objective lens, the CD signal cannot be reproduced. Thus, it is required that the recording beam and the reproducing beam are arranged close to each other so that wave front aberration does not exceed $0.07 \lambda$ and not more than the height of an image specified by the objective lens.

From the above, the actual arrangement of the recording beam and the reproducing beam is limited as follows:

(1) The recording beam and the reproducing beam should be arranged as shown in FIG. 13 so that the recording beam is ahead of the reproducing beam and that these beams are arranged on the same track.

Data should be recorded while the reproducing beam is made closer to the recording beam so that the reproducing beam and the reproducing beam are separated at a distance larger than the diameter of the recording beam spot in tangential direction and that wave front aberration generated by separating the recording beam from the reproducing beam is $0.07 \lambda$ or less and not more than the height of the image of the objective lens.

(2) The reproducing beam is ahead of the recording beam and the recording beam is one-track ahead of the reproducing beam. The reproducing beam is arranged close to the recording beam as shown in FIG. 14 so that the recording beam and the reproducing beam are separated at a distance larger than the diameter of the recording beam spot in tangential direction and that the wave front aberration generated by separating the recording beam from the reproducing beam is $0.07\lambda$ or less and not more than the height of the image of the objective lens.

In the optical apparatus in which a recording beam and a reproducing beam are arranged to satisfy either of the above two relationships, correction processings described in the first embodiment can be carried out. That is to say, a signal which has been just recorded can be reproduced by the signal reproduction system during recording operation and the asymmetry, jitter and the like of the reproduced signal are measured and light power is adjusted while data is being recorded.

Additionally, the above embodiments concern a combination of a recording beam and a reproducing beam. They may be replaced by two reproducing beams. In the 1latter case, as in the case of the above embodiment, the two beams are arranged so that wave front aberration is $0.07\lambda$ or less so as not to exceed the Marechal's limit, whereby normal data reproduction operation can be carried out.

As stated above in detail, the optical apparatus in the first embodiment according to the present invention can reproduce data right after the data is recorded in the recording operation of the optical disk recording/reproducing apparatus, and can carry out recording operation while correcting recording conditions by using the reproduced data. Furthermore, with this constitution, the optical apparatus in the first embodiment can reproduce the recorded data and automatically control focus offset and the like based on the asymmetry, jitter, data error rate and data signal amplitude of the reproduced data.

In the second embodiment according to the present invention, as long as two beams fall within the Marechal's limit, they can be arranged on a disk without adversely affecting operation. The second embodiment is intended to make it clear that the optical apparatus including two beams within that range has various features and their advantages of the first embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical apparatus for an optical disk recording/reproducing apparatus, comprising:

a first emitter configured to emit a recording beam for recording data on an optical disk;

a second emitter, provided near the first emitter, configured to emit a reproducing beam for reproducing the data recorded on the optical disk;

a detector configured to receive and detect reflection light of the reproducing beam emitted from the second emitter;

a recorder configured to record specific data, as trial recording, in a specific region of the optical disk by using the first emitter, the second emitter and the detector; and a corrector configured to reproduce the specific data recorded by the recorder, detect a position error between the recording beam and the reproducing beam based on the reproduced specific data, and correct the position error.

2. An optical apparatus according to claim 1, wherein the corrector is configured to detect asymmetry of the specific data, detect a position error between the recording beam and the reproducing beam based on the detected asymmetry, and correct the position error.

3. An optical apparatus according to claim 1, wherein the corrector is configured to detect jitter of the specific data, detect a position error between the recording beam and the reproducing beam based on the detected jitter, and correct the position error.

4. An optical apparatus according to claim 1, wherein the corrector is configured to detect a data error rate of the specific data, detect a position error between the recording beam and the reproducing beam based on the detected data error rate, and correct the position error.

5. An optical apparatus according to claim 1, wherein the corrector is configured to form a reproducing spot on a track of the optical disk, the recording spot being formed such that a recording spot formed by the recording beam is formed in front of the reproducing spot in the recording direction of the optical disk.

6. An optical apparatus according to claim 1, wherein
the second emitter is configured to emit the reproducing beam for reproducing data and forming a reproducing spot on a track of the optical disk, the reproducing spot being formed such that a recording spot formed by the recording beam is formed in front of the reproducing spot in the recording direction of the optical disk; and
the detector is configured to receive and detect reflection light of the reproducing spot formed by the second emitter, before the first emitter emits the recording beam and records the data and the disk makes a round.

7. An optical apparatus according to claim 1, wherein the second emitter is configured to emit the reproducing beam for reproducing data recorded on the optical disk such that a wave front aberration is $0.07\lambda$ or less, the wave front aberration generated when the recording beam emitted from the first emitter, as well as the reproducing beam, is arranged on a same track and such that the recording beam is emitted ahead of the reproducing beam in a recording direction.

8. An optical apparatus for an optical disk recording/reproducing apparatus, comprising:
a first emitter configured to emit a first beam onto an optical disk;
a second emitter, provided near the first emitter, configured to emit a reproducing beam for reproducing data recorded on the optical disk so that a wave front aberration is $0.07\lambda$ or less, the wave front aberration generated when a second beam is arranged near the first beam emitted from the first emitter;
a detector configured to receive and detect at least one of reflection light of the first beam emitted from the first emitter and reflection light of the second emitting beam emitted from the second emitter;
a recorder configured to record specific data, as trial recording, in a specific region of the optical disk by using the recording beam emitter, the reproducing beam emitter and the detector; and
a corrector configured to reproduce the specific data recorded by the recorder, detect a position error between the recording beam and the reproducing beam on the reproduced specific data, and correct the position error.

9. An optical apparatus according to claim 8, wherein
the first emitter includes a first beam configured to emit the first beam for reproducing the recorded data recorded on the optical disk; and wherein
the second emitter includes a second beam emitter configured to emit the second beam for reproducing the recorded data recorded on the optical data.

10. An optical apparatus according to claim 8, wherein
the first emitter emits a recording beam for recording data on the optical disk; and
the second emitter emits the reproducing beam for reproducing the recorded data recorded on the optical disk.

11. An optical apparatus according to claim 10, wherein the reproducing beam emitter is configured to emit the reproducing beam for reproducing data recorded on the optical disk so that a wave front aberration is $0.07\lambda$ or less, the wave front aberration generated when the reproducing beam is arranged on a track, on which the recording beam emitted from the recording beam emitter is arranged, and that the recording beam is ahead of the reproducing beam in a recording direction.

12. An optical apparatus according to claim 10, wherein the reproducing beam
emitter is configured to emit the reproducing beam for reproducing data recorded on the optical disk so that a wave front aberration is $0.07\lambda$ or less, the wave front aberration generated when the reproducing beam is arranged on a second track different from the first track on which the recording beam is emitted from the recording beam emitter is arranged and that the recording beam is ahead of the reproducing beam in a recording direction.

13. An optical apparatus according to claim 7, wherein the corrector is configured to detect a position error between the recording beam and the reproducing beam based on the detected asymmetry, and correct the position error.

14. An optical apparatus according to claim 8, wherein the corrector is configured to detect jitter of the specific data, detect a position error between the recording beam and the reproducing beam based on the detected jitter, and correct the position error.

15. An optical apparatus according to claim 6, wherein the corrector is configured to detect a data error rate of the specific data, detect a position error between the recording beam and the reproducing beam based on the detected data error rate, and correct the position error.

* * * * *